UNITED STATES PATENT OFFICE.

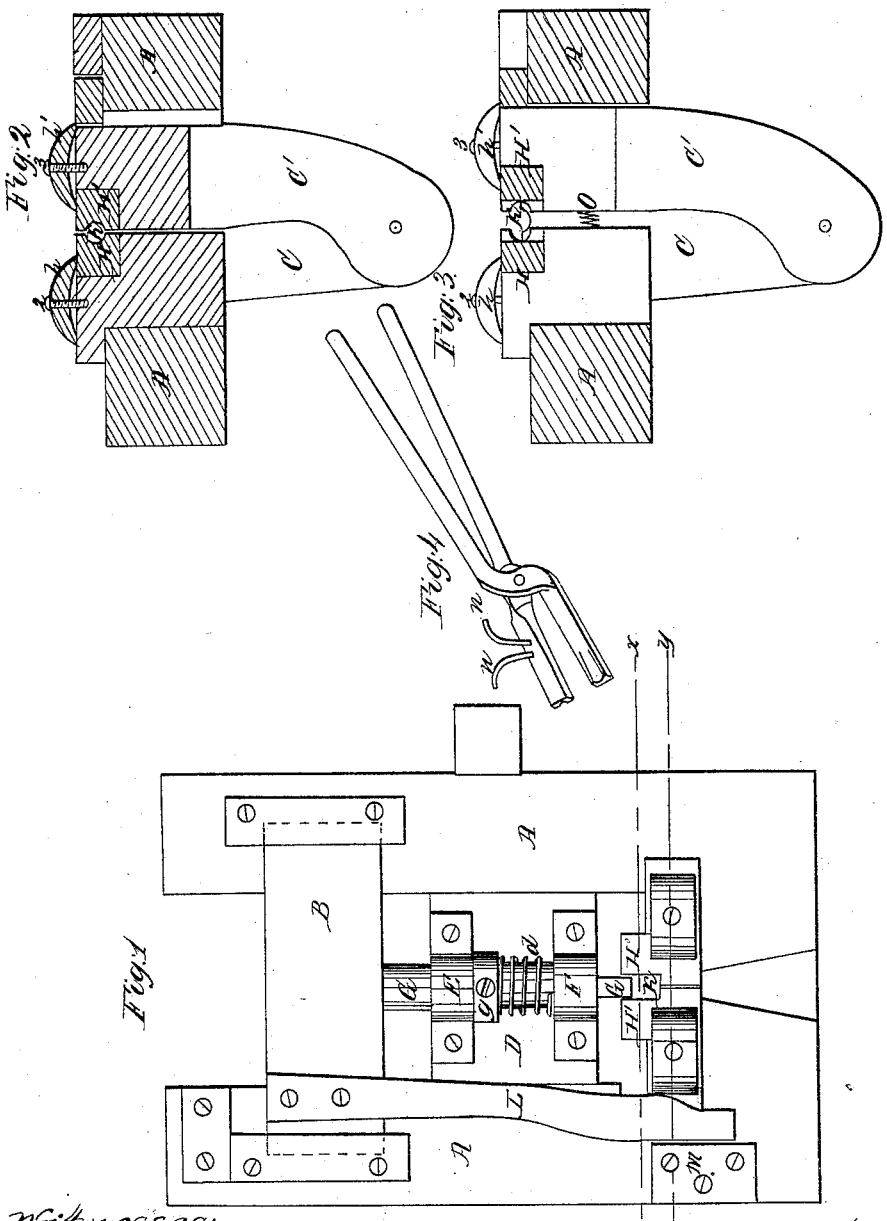

AARON MARCELLUS, OF ROCKFORD, ILLINOIS.

IMPROVED BOLT-MACHINE.

Specification forming part of Letters Patent No. 49,638, dated August 29, 1865.

*To all whom it may concern:*

Be it known that I, AARON MARCELLUS, of Rockford, in the county of Winnebago and State of Illinois, have invented a new and useful Improvement in Bolt-Machines, of which the following is a full, clear, and exact description, reference being had to the accompanying drawings, making part of this specification, and in which—

Figure 1 represents a plan or top view of so much of my improved bolt-heading machine as is necessary to illustrate my invention; Fig. 2, a section through the same at the line $x$ $x$ of Fig. 1; Fig. 3, a similar section at the line $y$ $y$ of Fig. 1, and Fig. 4 a view, in perspective, of the tongs for turning the bolt.

My invention relates to that class of machines which make the bolt-heads on straight rods by clamping the rod firmly and upsetting the end by a suitable die; and it is the object of my invention to make rectangular-headed bolts and finish the heads truly and of any desired thickness; and to these ends my improvement consists in the employment of dies having a recess to clamp the rod on which the bolt-head is to be formed, and a second recess to receive the head when compressed, in combination with a vibrating die moving within and occupying the width of the recess, so that a rectangular head can be truly finished in the same dies and at a single heat.

My invention further consists in the employment, in combination with the dies, of tongs for holding the bolts, and so gaged as to give a limited turn to the bolt and secure a constant form to the head of the shape desired.

In the accompanying drawings, the strong frame A, the vibrating head B, and the clamps C C′ of the known machine are clearly shown. To the frame A, I secure a plate, D, with proper guide-boxes E F for the reciprocating die G, which carries an adjustable collar, $g$, secured in position by a set-screw, 1. The position of this collar must be such as to permit a free reciprocation of the die G. A spring, $d$, encircles the die, and is placed between the collar $g$ and the guide-box F, and thus serves to retract the die G after every forward movement given it by the vibrating head B, which is actuated by the power that operates the machine. The retention of the lower end or head of the reciprocating punch or die G between the dies H H′ gives it perfect steadiness of motion and prevents it from turning. A slot and feather may also be used for this purpose.

The dies H H′ are clamping-jaws to secure the rod from which the bolt is to be formed, and the recesses for clamping the bolt may be of a form adapted to the shape of the rod of which bolts are to be made. In the drawings they are shown at K as adapted to round rods.

The clamping-dies H H′ have recesses K, of the size required for the width and of a depth sufficient for the thickness of the bolt-head, and also to clamp a proper portion of the lower end of the reciprocating die G, to keep it from turning, to guide it truly, and to hold it steadily upon the head of the bolt when compressed.

The dies are held in the clamping-jaws C C′ by the buttons or clips $h$ $h'$, fastened by set-screws 2 3; and it is obvious that the turn of the screw will permit the buttons or clips to turn, so that the dies H H′ may be changed for any size of dies required for particular bolts. The change of these dies, however, must, of course, be attended with a corresponding change of the reciprocating die G.

The clamping-dies may be made to open by a spring, $o$, Fig. 3, and one or both of the jaws C C′ may be movable. In the drawings one jaw only is represented as movable.

The movement of the jaw C′ is effected by the wedge-shaped arm L, which is attached at one end to the vibrating head B and moves with it, so that when the head B is retracted the wedged end of the arm L will be withdrawn from between the clamp-block M and the clamp-die C′, which will then be forced open by the spring $o$, to permit the introduction of the rod between the clamping-dies. When the head B advances the bar L will be pushed forward, and its wedged end, passing between the clamp-block M and jaw C′, will cause the latter to close upon and securely hold the rod from which the bolt is to be made. Thus the reciprocating die G will compress the heated end of the rod and form a head thereon of the thickness desired, and with its two sides square and parallel with each other.

To make square heads, or to square the ends of rectangular heads, it is only necessary, on the retraction of the head B, to give the bolt a quarter-turn in the dies, and their return movement will properly finish the head at a single heat.

To secure at all times, and at any speed of the machine, a proper and exact quarter-turn of the bolt within the dies to make a square or rectangular head, I employ the tongs N, having protecting or guiding wires $n$ on one of their jaws.

When the bar is introduced by the tongs into the dies and the head has received its first compression, and the reciprocating die G has been retracted and the jaws C' opened, a turn of the tongs either way until one of the guiding-wires $n$ shall touch the frame or the sides of the jaws will give the bolt-head its proper position to be accurately squeezed by the next forward movement of the reciprocating die.

It is obvious that by changing the guide-wires on the tongs I can effect a regulation of the distance they shall be permitted to turn while holding the bolt, and consequently the head may be finished as an octagon or with more or fewer sides, if desired.

What I claim as my invention, and desire to secure by Letters Patent, is—

The combination of a pair of double-recessed dies, one or both of which vibrate with a reciprocating die working between them, and with tongs constructed substantially as described, arranged and operating substantially as and for the purpose set forth.

In testimony whereof I have hereunto subscribed my name.

AARON MARCELLUS.

Witnesses:
 DEMIS W. BIGELOW,
 JOHN A. FULLER.